(12) United States Patent
Da Costa Pito et al.

(10) Patent No.: US 9,278,653 B2
(45) Date of Patent: Mar. 8, 2016

(54) FIXING SUPPORT FOR A PORTABLE ELECTRONIC DEVICE, CORRESPONDING DASHBOARD AND MOTOR VEHICLE

(75) Inventors: Sergio Da Costa Pito, Cergy (FR); Christian Brancheriau, Herblay (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 13/248,701

(22) Filed: Sep. 29, 2011

(65) Prior Publication Data
US 2012/0104195 A1    May 3, 2012

(30) Foreign Application Priority Data
Sep. 30, 2010   (FR) ..................... 10 57902

(51) Int. Cl.
*A47G 1/10* (2006.01)
*B60R 11/02* (2006.01)
*B60R 11/00* (2006.01)

(52) U.S. Cl.
CPC ......... *B60R 11/0241* (2013.01); *B60R 11/0258* (2013.01); *B60R 2011/0005* (2013.01); *B60R 2011/0071* (2013.01); *B60R 2011/0078* (2013.01)

(58) Field of Classification Search
CPC ............ B60R 11/0241; B60R 11/0258; B60R 2011/0005; B60R 2011/0071; B60R 2011/0078

USPC ............. 248/121, 126, 176.1, 292.14, 316.1, 248/316.6, 346.06, 346.07, 670, 671, 689, 248/905, 918, 292.12, 295.11, 297.31, 248/316.4, 408, 409

See application file for complete search history.

(56) References Cited

U.S. PATENT DOCUMENTS

| | | | | |
|---|---|---|---|---|
| 5,995,622 | A * | 11/1999 | Roussy et al. | 379/446 |
| 6,322,030 | B1 * | 11/2001 | Marra | 248/284.1 |
| 6,665,524 | B1 * | 12/2003 | Niemann | 455/575.6 |
| 6,798,457 | B2 * | 9/2004 | Boyden et al. | 348/373 |
| 7,158,092 | B2 * | 1/2007 | Shen | 343/878 |
| 2007/0018064 | A1 * | 1/2007 | Wang | 248/274.1 |

FOREIGN PATENT DOCUMENTS

DE   20 2005 015737 U1   12/2005
KR       200 438 202 Y1    1/2008

OTHER PUBLICATIONS

French Search Report dated May 20, 2011 for priority application FR 1057902 and Translation.

* cited by examiner

*Primary Examiner* — Gwendolyn Baxter
(74) *Attorney, Agent, or Firm* — Reising Ethington P.C.

(57) ABSTRACT

A fixing support is provided for a portable electronic device, in particular in a motor vehicle. The fixing support includes a fixed base for receiving the electronic device, a retainer movably mounted on the fixed base between an idle position to place the electronic device on the fixed base and an active position to retain the electronic device on the fixed base, and a one-way lock adapted to allow the retainer to move from the idle position toward the active position, while preventing the retainer from moving from the active position toward the idle position. A motor vehicle dashboard and a motor vehicle are also provided.

14 Claims, 4 Drawing Sheets

FIXING SUPPORT FOR A PORTABLE ELECTRONIC DEVICE, CORRESPONDING DASHBOARD AND MOTOR VEHICLE

This claims the benefit of French Patent Application No. 10 57902 filed on Sep. 30, 2010 and hereby incorporated by reference herein.

The present invention relates to a fixing support for a portable electronic device, in particular in a motor vehicle.

BACKGROUND

An increasing number of portable devices having a large number of functionalities are available to users, and in particular motor vehicle drivers.

In particular, devices such as mobile telephones, in particular smartphones, personal digital assistants (PDA) or position determination devices, in particular using a GPS (Global Positioning System), help a motor vehicle driver to determine a route, to inform him of traffic conditions or help him to drive his vehicle.

Such devices are for example controlled by using a touch screen that must therefore be accessible to the driver without, however, requiring him to hold the device in his hand, which would constitute a risk for driving the vehicle.

It is thus known to provide a support for the electronic device close to the driver, for example on the dashboard of the motor vehicle, in order to maintain the device while leaving the screen free to make it possible to control it without taking it in hand.

SUMMARY OF THE INVENTION

An object of the present invention is to provide a fixing support for an electronic device that is practical and easy to use.

The present invention provides a fixing support for a portable electronic device, in particular in a motor vehicle, including a fixed base for receiving the electronic device including an upper piece and a lower piece extending the upper piece downward, the lower piece being slidingly mounted on the upper piece so as to adjust the height of the space for receiving the electronic device. The fixing support further including a retaining member movably mounted on the fixed base between an idle position to place the electronic device on the fixed base and an active position to retain the electronic device on the fixed base, and a one-way locking means adapted to allow the retaining member to move from the idle position toward the active position, while preventing the retaining member from moving from the active position toward the idle position.

The fixing support according to the present invention may include one or more of the following features:

- the retaining member is pivotably mounted on the base around a pivot axis; the locking means includes a flexible spring leaf fixed on the base;
- the locking means includes at least one locking lug/toothing assembly, the locking lug and the toothing being adapted to cooperate by mutual engagement;
- the locking means includes two identical locking lug/toothing assemblies, the two assemblies being offset relative to each other so as to perform an alternating locking of the retaining member;
- the two locking lugs are arranged at a same level along a longitudinal axis, the two toothings being offset relative to each other;
- the toothings are provided on the retaining member;
- the support includes a release means adapted to release the locking means so as to allow the retaining member to move from its active position toward its idle position;
- the release means includes a push-button that can be actuated by pushing in; and the base defines an adjustable space for receiving the electronic device.

The present invention also provides a motor vehicle dashboard, characterized in that it includes a fixing support as defined above.

The invention also provides a motor vehicle, characterized in that it includes a dashboard having a fixing support as defined above.

BRIEF DESCRIPTION OF THE DRAWINGS

The present invention will be better understood upon reading the following description, provided solely as an example and done in reference to the appended drawings, in which.

DETAILED DESCRIPTION

Figure 1:
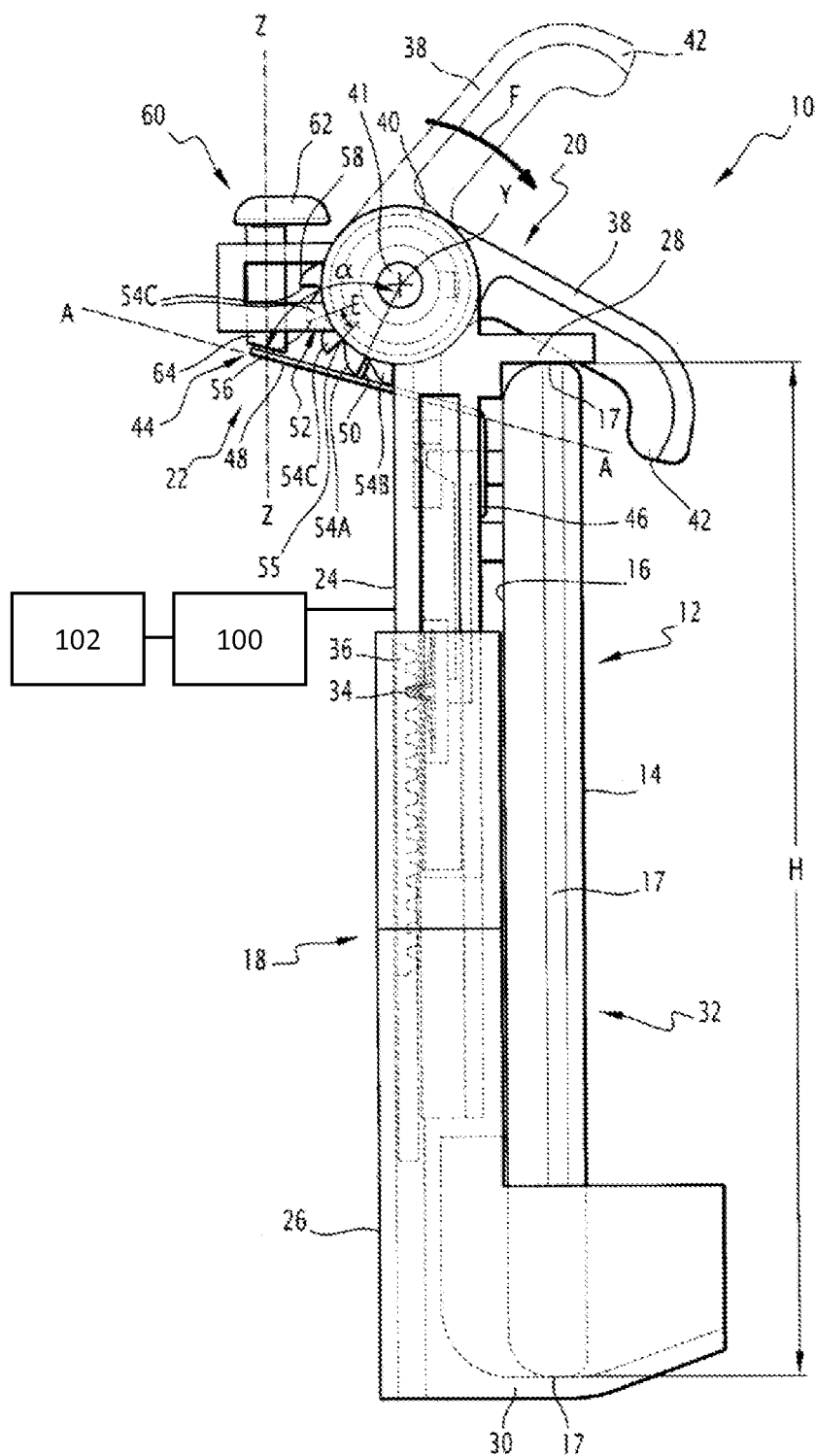
FIG. 1 is a side view of a support according to a first embodiment of the invention, the support being in the active configuration.
Figure 2:
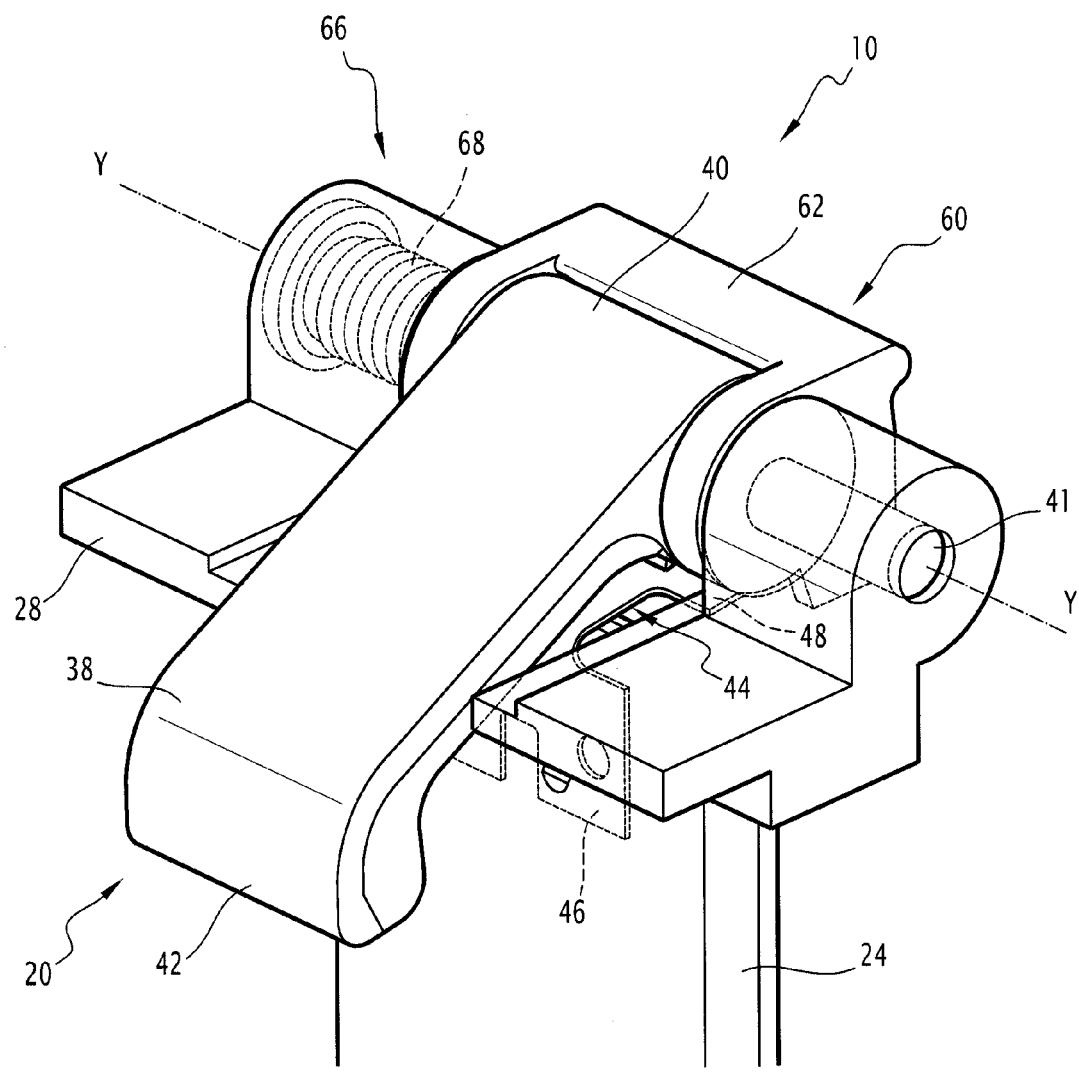
FIGS. 2 and 3 are front and rear perspective views, respectively, of a support according to a second embodiment of the invention, the support being in the active configuration.
Figure 3:
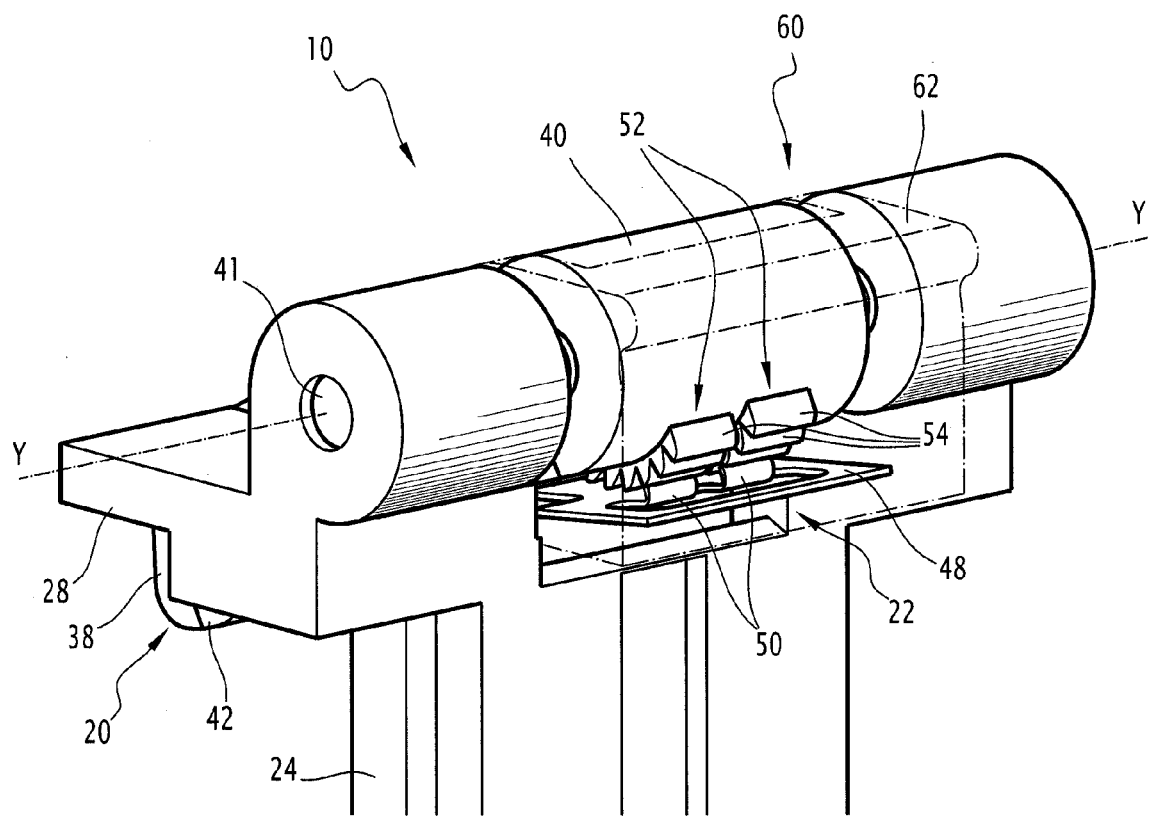

The support 10 shown in FIGS. 1 to 3 may fix portable electronic devices such as a mobile telephone, personal digital assistant or position determination device, for example, to a dashboard in a motor vehicle.

As shown in FIG. 1, a device 12 of this type is traditionally parallelepiped and includes a front face 14 provided with a display screen, for example a touch screen also making it possible to control the device, a rear face 16 and peripheral or side faces 17 connecting the front face 14 to the rear face 16.

The support 10 comprises a fixed base 18, for example fixed on a motor vehicle dashboard 100 of a motor vehicle 102, both shown schematically, a retainer, for example, retaining member 20 movably mounted on the base 18 and a one-way lock, for example, locking means 22 for the retaining member 20.

Hereafter, the directions indicated, such as "upper," "lower," "high," "low," "transverse" and "longitudinal," correspond to those of the vehicle.

The base 18 includes an upper piece 24 fixed on the dashboard using any suitable means and extended downward by a lower piece 26.

The upper piece 24 has an upper end 28 forming a high stop that protrudes substantially perpendicular to the rest of the upper piece 24 and the lower piece 26 has a lower end 30 forming a low stop that protrudes substantially perpendicular to the rest of the lower piece 26, the upper 28 and lower 30 ends extending substantially parallel to each other.

The upper 24 and lower 26 pieces thus define a receiving space 32 for receiving the device 12.

The lower piece 26 is slidingly mounted on the upper piece 24 so as to adjust the height H of the receiving space 32, thereby allowing the support 10 to receive devices 12 of different sizes. The upper 24 and lower 26 pieces thus define means for keeping the device 12 in the receiving space 32.

The height H of the receiving space 32 is manually fixed via a locking pin 34 secured to the upper piece 24 and cooperating with a rack 36 provided on the lower piece 26. Such an arrangement prevents any untimely displacement of the height H of the receiving space 32.

The adjustment of the height H of the receiving space 32 can thus be done independently of the locking of the device 12 by the retaining member 20, which simplifies the use of the support 10.

The retaining member 20 assumes the form of a retaining claw 38 having a first substantially cylindrical end 40 pivotably mounted on a shaft 41 secured to the upper piece 24 around a substantially transverse pivot axis Y-Y, here perpendicular to the plane of FIG. 1.

The claw 38 is movably mounted between an idle position (shown in broken lines in FIG. 1) and an active position (shown in solid lines in FIG. 1) in the direction of arrow F.

In the idle position, the claw 38 is lifted, a free end 42 of claw 38 is distanced from the upper piece 24 to allow a user to arrange the device 12 on the base 18 in the receiving space 32.

In the active position, the claw 38 is lowered, free end 42 being close to the upper piece 24, the claw 38 then being in contact with a lateral edge, for example, an upper side face 17 of the device 12 so as to retain the device 12 on the base 18 in the receiving space 32.

Between the idle position and the active position, the claw 38 is configured to adopt a plurality of consecutive intermediate locking positions in which the claw 38 is lowered step by step so as to come closer to the upper piece 24, the claw not being in contact with the device 12.

The one-way locking means 22 are adapted to allow movement of the retaining claw 38 from the idle position toward the active position, while also preventing movement of the claw 38 from the active position toward the idle position.

More generally, the locking means 22 are adapted to allow movement of the retaining claw 38 from the idle position toward any intermediate locking position, while preventing the claw 38 from moving from the considered intermediate locking position toward the idle position.

The locking means 22 include at least one locking lug/toothing assembly. The locking means 22 also include a flexible spring leaf 44 having a substantially L-shaped profile, one branch 46 of the "L" being fixed on the upper piece 24 using any suitable means, in particular by heading.

Figure 4:
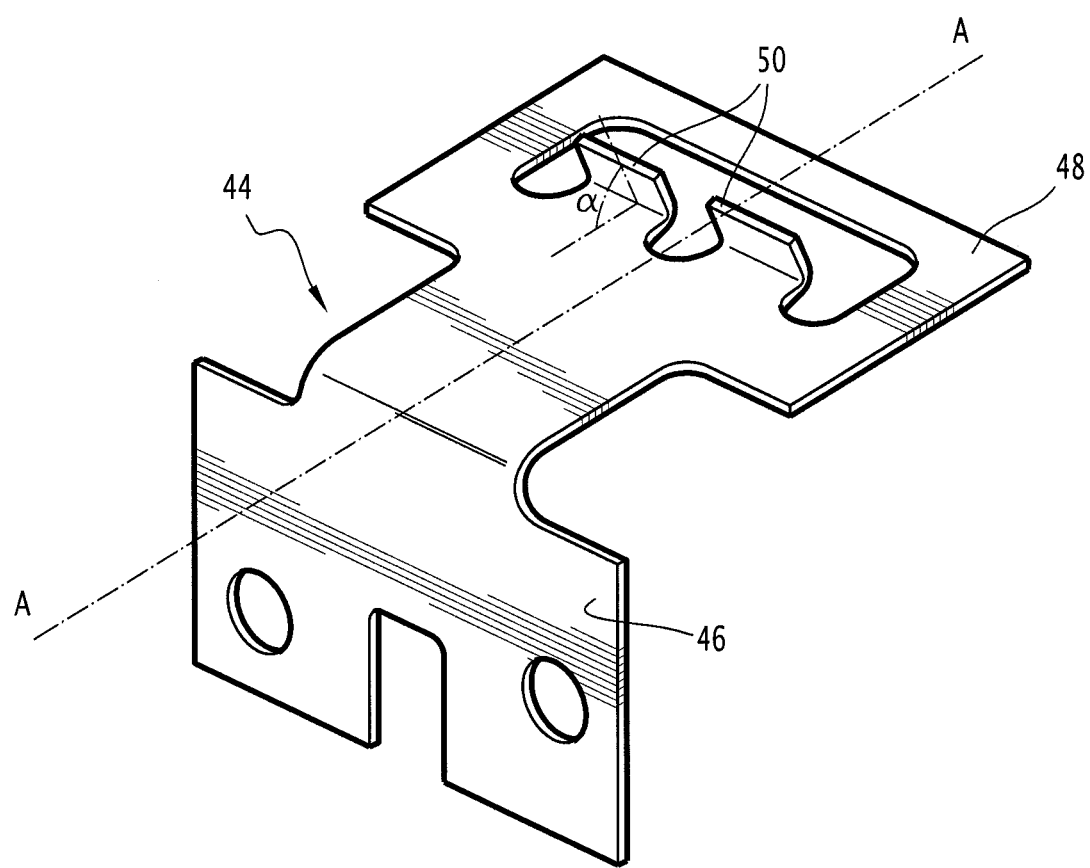
FIG. 4 is a perspective view of locking means for the supports of FIGS. 1 to 3.

In reference to FIG. 4, the spring leaf 44 includes, on the free branch 48 of the "L," at least one locking lug 50 adapted to cooperate by mutual engagement with a toothing 52 (FIG. 1) provided on the retaining claw 38.

In the embodiment described here, the locking means 22 include two identical locking lug 50/toothing 52 assemblies, the two assemblies being offset relative to each other so as to perform an alternating locking of the retaining claw 38. The two locking lug 50/toothing 52 assemblies alternatingly lock the retaining claw 38.

More specifically, the spring leaf 44 includes two identical locking lugs 50 protruding upward from the free branch 48 and each adapted to cooperate by mutual engagement with a toothing 52.

There are therefore as many toothings 52 as locking lugs 50.

The two locking lugs 50 are arranged at a same level along a substantially longitudinal axis A-A extending along the length of the free branch 48.

The lugs 50 are tilted relative to the free branch 48 by an angle α comprised between, for example, 70° and 80°, and preferably substantially equal to 74.5°.

The spring leaf 44 is made from spring steel and obtained for example by cutting and folding, for example by stamping. The locking lugs 50 are integral with the rest of the spring leaf 44.

As illustrated in FIG. 1, the toothings 52 are identical and each include a plurality of identical teeth 54, here five, for example, protruding toward the outside of the cylindrical end 40 of the claw 38, and defining notches 55 between them.

Each tooth 54 is provided with a substantially radial planar locking face 56 relative to the end 40 and an outwardly curved sliding face 58 relative to the end 40.

The sliding face 58 is thus adapted to "slide" against the locking lug 50, the spring leaf 44 bending slightly downward and allowing the corresponding tooth 54 to pass, thereby allowing the retaining claw 38 to move from the idle position toward the active position or an intermediate locking position, while the locking face 56 is adapted to trip over the lug 50, preventing the claw 38 from moving from the active position or an intermediate locking position toward the idle position.

In the idle position of the claw 38, the locking lug 50 is arranged at one end of the toothing 52 and does not cooperate with any tooth 54.

In the active position, the claw 38 is in contact with the device 12 and the locking lug 50 is arranged between the locking face 56 of the tooth 54A and the sliding face 58 of the following tooth 54B.

In the embodiment described here, there are therefore three intermediate locking positions in each of which the claw 38 is not yet in contact with the device 12 and the lug 50 is arranged between the locking face 56 of a tooth 54C and the sliding face 58 of the following tooth 54C or the tooth 54A.

Of course, the number of intermediate locking positions as well as the active position of the claw 38 vary as a function of the size of the device 12 to be fixed on the support 10, only the idle position remaining unchanged.

For example, when the device has a size, in particular a thickness, that is larger than that of the device 12 illustrated in FIG. 1, the number of intermediate positions is reduced to two.

As better seen in FIG. 3, the two teeth 52 are positioned circumferentially on the end 40 so as to be angularly offset relative to each other with an angular offset pitch substantially equal to the half of the thickness E of a tooth 54, the thickness E being taken at the base of the tooth 54 (FIG. 1).

The thickness E of a tooth 54 is substantially comprised between, for example, 20° and 30°, preferably substantially equal to 25°.

The offset of the two toothings 52 makes it possible to obtain a more fine angular pitch between each successive position assumed by the claw 38 by practically doubling the number of intermediate positions, thereby allowing a better locking of the claw 38 in the active position and therefore better maintenance of the device 12 on the base 18.

The claw 38 is manufactured from, for example, PC-ABS (polycarbonate-ABS) or charged polyamide. The toothings 52 are integral with the rest of the claw 38.

In the illustrated embodiment, the locking means 22 comprise two locking lugs 50 and two toothings 52 each associated with a lug 50 to produce the two lug 50/toothing 52 assemblies.

Alternatively, the locking means 22 comprise a single locking lug 50 that cooperates by mutual engagement with the two toothings 52 offset relative to each other.

Also alternatively, the locking means 22 comprise two locking lugs 50 longitudinally offset relative to each other along axis A-A and that cooperate with a single toothing 52 or with two toothings 52 positioned circumferentially at the same level on the end 40 of the claw 38.

Furthermore, in the illustrated embodiment, the lugs 50 are provided on the spring leaf 44 and the toothings 52 are provided on the claw 38.

Alternatively, the locking lugs 50 are arranged on the end 40 of the retaining claw 38 and the toothings 52 are provided on the spring leaf 44.

The support 10 also comprises a release, for example, release means 60 adapted to release the locking means 22 so as to allow the retaining claw 38 to move from the active position or an intermediate locking position toward the idle position.

In the considered example, the release means 60 assume the form of a push-button 62 actuated by pushing in and having a support face 64 intended to push on the free branch 48 of the spring leaf 44 to cause the locking lugs 50 and the toothings 52 to disengage.

According to a first embodiment of the invention corresponding to FIG. 1, the push-button 62 is slidingly mounted on the upper piece 24 along a substantially vertical axis Z-Z and perpendicular to the transverse axis Y-Y.

According to a second embodiment of the invention illustrated in FIGS. 2 and 3, the push-button 62 is mounted rotationally mobile on the shaft 41 of the upper piece 24 around the transverse axis Y-Y.

The support 10 also includes a return device, for example, elastic return means 66 able to stress the retaining claw 38 in the idle position.

These return means 66 for example comprise a helical spring 68 (FIG. 2) mounted on the shaft 41 and continuously acting on the claw 38, the spring 68 being fixed at one end on the claw 38 and at the other end on the upper piece 24.

The operation of the support 10 is explained below.

Initially, the retaining claw 38 is in the idle position.

When a user wishes to fix a device 12 on the support 10, he inserts the device 12 into the receiving space 32 by pressing the rear face 16 against the base 18, and then adjusts the height H of the receiving space 32 using the pin 34/rack 36 system so as to keep the device 12 in the vertical position in the receiving space 32.

He then lowers the claw 38 toward the active position, against the spring 68.

The claw 38 then successively goes through the intermediate locking positions, the sliding face 58 of the teeth 54C and the tooth 54A sliding against the locking lug 50, until claw 38 comes into contact with the device 12.

The claw 38 is then in the active position, locked in rotation in the direction of arrow F by contact with the device 12 and in the direction opposite to arrow F, the locking face 56 of the tooth 54A tripping over the locking lug 50.

The device 12 is thus kept firmly in position in the receiving space 32 of the support 18.

When the user wishes to release the device 12 from the support 10, he needs only to push the push-button 62 in downward, thereby releasing the locking lugs 50 from the toothings 52.

The claw 38 is then automatically returned to the idle position under the effect of the spring 66, and the device 12 can finally be released from the support 10.

The present invention therefore proposes a fixing support for an electronic device that is easy to use because to fix a device on the support, a user needs only to insert the device on the base, to adjust the height of the receiving space and to lower the retaining claw.

Conversely, to disengage the device from the support, the user needs only to actuate the push-button and to release the device from the base.

The present invention thus allows an easy engagement/disengagement of the device on the support while ensuring a good resistance of the device during the operation of the vehicle, in particular during a violent impact suffered by the vehicle.

The fixing support according to the present invention may advantageously include means for keeping the device in position, adapted to devices of variable sizes, formed by the upper piece 24 and the lower piece 26 defining the receiving space 32 intended to receive the device 12, and a retaining member 20 separate from the means for keeping the device in position preventing the abrupt disengagement of the device, in particular upon an impact. Thus, irrespective of the size of the device, this latter is retained correctly by the fixing support according to the present invention.

By avoiding an abrupt disengagement of the device in this way during an impact, the fixing support according to the present invention may provide good security, not only by limiting the risks of damaging the device and/or adjacent pieces of the support, but also by limiting the risks of injuries to the vehicle's passengers.

Furthermore, the support according to the present invention may be made up of a reduced number of simple elements and can therefore be obtained easily and at a low cost.

Furthermore, the support according to the present invention may make it possible to fix devices of various sizes, which makes it a universal fixing support.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A fixing support for a portable electronic device comprising:
    a fixed base for receiving an electronic device, the fixed base including a fixed upper piece, the upper piece having an upper stop end for receiving an upper side face of the device, wherein the upper stop end protrudes perpendicular to the rest of the upper piece;
    a lower piece having a lower end for receiving a lower side face of the device, the lower piece being slidingly mounted on the upper piece so as to allow adjustment of a height of a receiving space for receiving the electronic device, wherein the lower piece extends downward from the upper piece;
    a retainer mounted on the upper piece of the fixed base and moveable relative to the perpendicular protruding upper stop end between a first position to place the electronic device on the fixed base and a second position to retain the electronic device on the fixed base, the retainer being movable between the first and second positions separately from adjustment of the height of the receiving space; and
    a lock adapted to allow the retainer to move from the first position toward the second position, while preventing the retainer from moving from the second position toward the first position.

2. The fixing support according to claim 1, wherein the retainer is pivotably mounted on the fixed base around a pivot axis.

3. The fixing support according to claim 1, wherein the lock includes a flexible spring leaf fixed on the fixed base.

4. The fixing support according to claim 1, wherein the lock includes at least one locking lug and toothing assembly, the assembly comprising a locking lug and a toothing, the locking lug and the toothing being adapted to cooperate by mutual engagement.

5. The fixing support according to claim 4, wherein the toothings are provided on the retainer.

6. The fixing support according to claim 1, wherein the lock includes two identical locking lug and toothing assemblies, each one of the assemblies comprising a locking lug and a toothing, the two assemblies being offset relative to each other so as to perform an alternating locking of the retainer.

7. The fixing support according to claim 6, wherein the two locking lugs are arranged at a same level along a longitudinal axis, the two toothings being offset relative to each other.

8. The fixing support according to claim 1, further comprising a release adapted to release the lock to allow the retainer to move from the second position toward the first position.

9. The fixing support according to claim 8, wherein the release includes a push-button that can be actuated by pushing in.

10. The fixing support according to claim 1, wherein the fixed base defines the receiving space.

11. The fixing support according to claim 1, wherein the fixing support supports a portable electronic device in a motor vehicle.

12. A motor vehicle dashboard comprising:
the fixing support according to claim 1.

13. A motor vehicle comprising:
a dashboard; and
the fixing support according to claim 1.

14. A fixing support for a portable electronic device, comprising:

a fixed base for receiving an electronic device;

a first piece having a first stop end; for receiving a first side face of the device;

a second piece having a second stop end for receiving a second side face of the device opposed to said first side face of the device, the second piece being slidingly mounted on the first piece so as to allow adjustment of a height of a receiving space for receiving the electronic device along an extending direction, wherein the first piece extends along the extending direction from the second piece, the first piece being fixed to the fixed base, and wherein the first and second stop ends protrude perpendicular to the extending direction and are parallel to each other;

a retainer mounted on the first piece and moveable relative to the first stop end between a first position to place the electronic device on the fixed base and a second position to retain the electronic device on the fixed base, the retainer being movable between the first and second positions separately from adjustment of the height of the receiving space; and a lock adapted to allow the retainer to move from the first position toward the second position, while preventing the retainer from moving from the second position toward the first position.

* * * * *